United States Patent [19]
Kiwaki et al.

[11] 3,914,672
[45] Oct. 21, 1975

[54] CHOPPER CONTROL SYSTEM
[75] Inventors: Hisakatsu Kiwaki; Yoshimitsu Onoda; Masahiko Ibamoto, all of Katsuta, Japan
[73] Assignee: Hitachi, Ltd., Japan
[22] Filed: Nov. 30, 1973
[21] Appl. No.: 420,570

[30] Foreign Application Priority Data
Dec. 4, 1972  Japan............................. 47-121823

[52] U.S. Cl.............................. 318/246; 318/341
[51] Int. Cl.² ........................................ H02P 5/06
[58] Field of Search ........... 318/139, 246, 249, 341, 318/345, 346, 599

[56] References Cited
UNITED STATES PATENTS
| | | | |
|---|---|---|---|
| 2,799,819 | 7/1957 | Brown................... | 318/246 |
| 3,343,055 | 9/1967 | Haulicek et al................ | 318/341 X |
| 3,457,485 | 7/1969 | Leonard.......................... | 318/341 X |
| 3,729,664 | 4/1973 | Montross..................... | 318/139 |

*Primary Examiner*—Robert K. Schaefer
*Assistant Examiner*—W. E. Duncanson, Jr.
*Attorney, Agent, or Firm*—Craig & Antonelli

[57] ABSTRACT

A chopper is connected in series between a d.c. power supply and a d.c. motor for controlling the speed of the d.c. motor. Means for controlling the chopper comprises a magnetic multivibrator and a magnetic phase shifter driven by the multivibrator. This magnetic phase shifter is of a magnetomotive force comparing type and is composed of a bias winding, a control winding, a feedback winding and an output winding wound around a saturable core. The output of the magnetic multivibrator is differentiated to provide a signal for turning on the chopper and the output of the magnetic phase shifter is differentiated to provide a signal for turning off the chopper.

9 Claims, 6 Drawing Figures

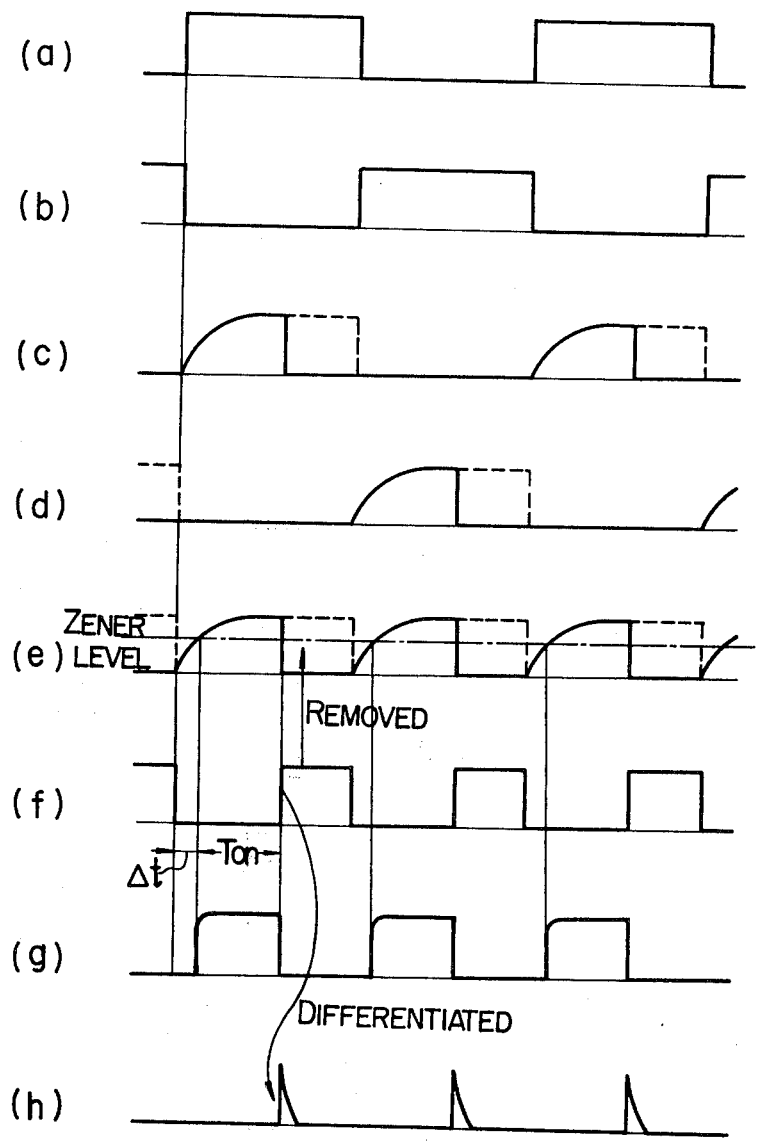

CHOPPER CONTROL SYSTEM

This invention relates to improvements in the structure of chopper control means for controlling choppers which interrupt the flow of direct current from a d.c. power supply for adjusting direct current supplied to a load.

Choppers are widely practically used in railroad cars (especially underground railroad cars), battery operated locomotives used for construction and repair purposes, electromobiles, etc.

This chopper is a switching means which interrupts the flow of direct current and in which the ratio between the conducting period of time and the non-conducting period of time can be continuously varied. It is well known that the chopper has various advantages including freedom from heat and other losses and capability of static and continuous current control. The chopper is almost invariably composed of thyristors. More precisely, the chopper is generally composed of a main thyristor used for conduction of main current and an auxiliary thyristor used for turning off this main thyristor and is arranged so that a reverse voltage can be applied to the main thyristor when the auxiliary thyristor is rendered conductive. Therefore, a chopper control means is required for applying a turning-on signal to the main thyristor thereby turning on the chopper and for applying a turning-on signal to the auxiliary thyristor thereby turning off the chopper.

A chopper control system is generally composed of a plurality of sections including a section for generating a reference value of a controlled variable such as rotational speed, voltage or current of a controlled object, a section for detecting the actual controlled variable, a section for comparing the detected controlled variable with the reference value thereby deriving the difference or error therebetween, a section for amplifying this error, a section for converting the output of the amplifying section into a duty factor signal, a section for shaping the waveform of this duty factor signal and power amplifying the signal up to a predetermined level, and a section for finally transmitting this signal to the chopper in electrically isolated relation. Further, more functional elements including protecting means are required in the chopper control system.

An attempt has been made to compose such a chopper control system by semiconductor elements such as transistors. However, due to the fact that semiconductor elements such as transistors tend to be adversely affected by noise and have a short service life resulting in poor reliability, it has been common practice to employ a magnetic means in the system in combination with the electrical means. This magnetic means is generally incorporated in the section which converts the amplified error into the duty factor signal applied to the chopper, and a magnetic phase shifter of voltage reset type (Ramey type) has been generally employed in this section.

This magnetic phase shifter of voltage reset type comprises a pair of saturable cores which are alternately saturated during the positive and negative half cycles respectively of a.c. voltage thereby delivering respective outputs, and the saturation timing of the cores is controlled by the error above described. Each of these saturable cores is energized in one direction depending on the magnitude of the error during the half cycle in which no output appears therefrom while it is energized in the opposite direction during the next half cycle in which the output is to appear therefrom, and use is made of the property of the saturable cores in which the saturation timing is variable relative to the quantity reset by the error. Therefore, this magnetic phase shifter is called the voltage reset type since the reset quantity due to the varying voltage is compared with the product of voltage and time.

However, this magnetic phase shifter of the voltage reset type possesses merely the function of converting the error into the firing-angle signal among various functions which the chopper control system should possesses. Thus, many parts constituted by transistors and other elements are still required in order that the chopper control system can possess the other functions. This results in the following defects:

1. Many parts are required resulting in low reliability.
2. Difficulty is encountered in isolating the main circuit from the control circuit.
3. When such isolation is not provided, the degree of freedom in design is degraded due to the difference between the potentials, and the chopper control means tend to be adversely affected by noise.

It is therefore an object of the present invention to provide a chopper control system of simple construction in which the desired multiple functions can be attained by a single part and the number of required parts can thus be reduced.

A further object of the present invention is to provide a chopper control system which can operate continuously with a stable control characteristic and which is improved in the fail safe aspect too.

According to a first feature of the present invention, the chopper control system comprises an oscillator and a magnetic phase shifter, and this magnetic phase shifter comprises a saturable core, a control winding wound around said core to be applied with a control instruction signal, and an output winding wound around said core to be applied with the output of said oscillator.

The magnetic phase shifter having such a construction is called herein a magnetomotive force comparing type compared with the conventional voltage reset type. This magnetic phase shifter of the magnetomotive force comparing type can singly exhibit many functions required for the chopper control system as described later thereby reducing the number of parts and can greatly improve the reliability.

According to a second feature of the present invention, a "negation" of the output of the magnetic phase shifter of the magnetomotive force comparing type is utilized as a signal for turning on the chopper.

By virtue of such an arrangement, the chopper control system incorporating the magnetic phase shifter of the magnetomotive force comparing type therein can operate with an ideal control characteristic as described later.

Other objects, features and advantages of the present invention will be apparent from the following description of a few preferred embodiments thereof taken in conjunction with the accompanying drawings, in which:

FIG. 6 shows voltage waveforms appearing at various parts of FIG. 5 for illustrating the operation of the system shown in FIG. 5.

The present invention will be described with reference to an example in which a d.c. series motor is driven by a battery through a chopper as in an electromobile.

Figure 1:
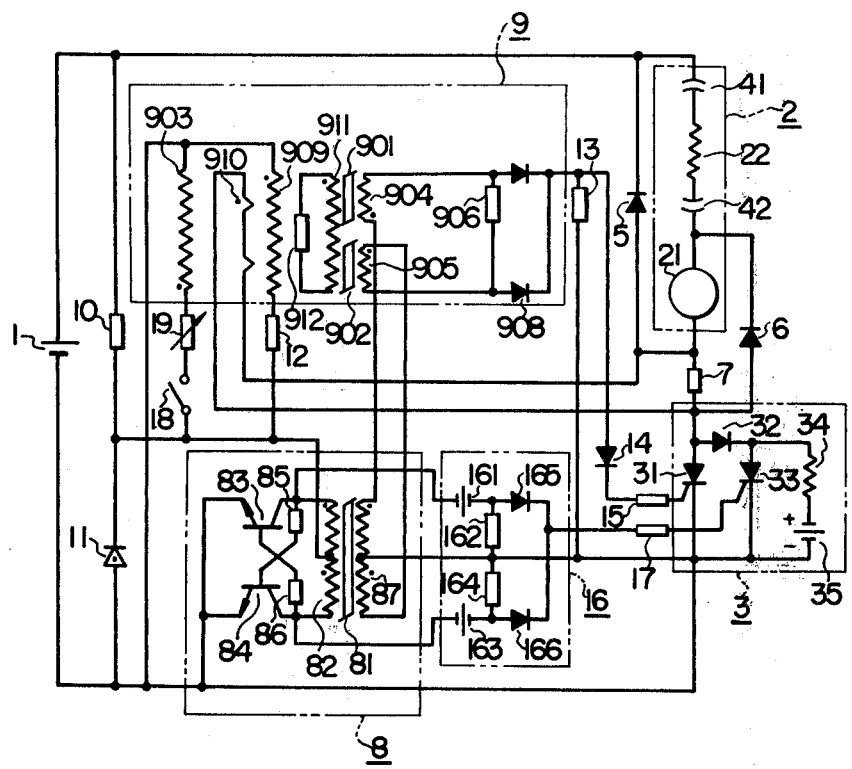
FIG. 1 is an electrical circuit diagram of an embodiment of the chopper control system according to the present invention.

Referring to FIG. 1, a d.c. series motor 2 having an armature 21 and a field coil 22 is connected in series with a battery 1 and a chopper 3. A pair of reversers 41 and 42 are disposed on the opposite ends of the field coil 22 so as to reverse the direction of rotation of the motor 2. This chopper 3 is of the repulsion pulse type commonly well known in the art. In the chopper 3, a series circuit of a diode 32 and an auxiliary thyristor 33 is connected in parallel with a main thyristor 31, and a series circuit of a reactor 34 and a capacitor 35 is connected in parallel with the auxiliary thyristor 33.

In response to the application of a turning-on signal to the main thyristor 31 in this chopper 3, the main thyristor 31 is turned on to allow the flow of current from the battery 1 to the motor 2. When a turning-on signal is applied to the auxiliary thyristor 33 in the conducting state of the main thyristor 31, the charge of the illustrated polarity stored in the capacitor 35 circulates through the circuit which is traced from the capacitor 35 to reactor 34 to auxiliary thyristor 33 and to the capacitor 35, and the capacitor 35 is charged in a polarity opposite to that illustrated by the LC oscillation. Therefore, this voltage is applied to the main and auxiliary thyristors 31 and 33 in the reverse direction and both these thyristors are turned off.

By the repetition of the above operation, the main thyristor 31 in the chopper 3 is repeatedly turned on and off so that the battery voltage can be intermittently applied to the motor 2. The current flowing through the motor 2 circulates through a flywheel diode 5 even in the "off" period of time of the chopper 3 and thus the current can continuously flow through the motor 2 without any interruption. Therefore, by repeatedly turning on and off the chopper 3 and suitably adjusting the ratio between the "on" period of time and the "off" period of time of the chopper 3, the mean voltage applied to the motor 2 can be continuously varied to control the speed of the motor 2.

The duty factor $\alpha$ of the chopper 3 is given by $$\alpha = \frac{T_{on}}{T_{on} + T_{off}} \quad (1)$$

where $T_{on}$ is the "on" period of time of the chopper and $T_{off}$ is the "off" period of time of the chopper. The mean voltage $E_m$ applied to the motor 2 is given by $$E_m = \alpha \cdot E_B \quad (2)$$

where $E_B$ is the voltage of the battery 1. Therefore, the speed of the motor 2 can be freely controlled by the chopper 3 whose duty factor $\alpha$ can be continuously adjusted substantially in the range of from 0 to 1.

A brake can be imparted to the motor 2 by reversing the connection of the field coil 22 by the reversers 41 and 42. The driving torque for the motor 2 is reversed to brake the rotation of the motor 2 with the result that the speed of the motor 2 is abruptly decreased. In this case, the voltage induced in the armature 21 has a forward direction relative to the flywheel diode 5, and thus, current cirulates through the circuit which is traced from the armature 21 to diode 5 to field coil 22 to the armature 21 so that the motor 2 is self-excited. Further, the voltage induced in the armature 21 has also a forward direction relative to another diode 6 connected in parallel therewith in a direction as shown, and thus, current circulates through the circuit which is traced from the armature 21 to resistor 7 to diode 6 in the armature 21 to impart a dynamic braking action which prevents the motor 2 from reverse rotation.

The structure and operation of a main circuit of a motor control system employing a chopper will be understood from the above description. A chopper control system for applying an on-off signal to the chopper is required in order to realize such an operation.

This chopper control system is composed principally of an oscillator 8 and a magnetic phase shifter 9 of the magnetomotive force comparing type. The oscillator 8 determines the control frequency for controlling the chopper 3, and the control period $(T_{on} + T_{off})$ for the chopper 3 is necessarily determined by this control frequency. The magnetic phase shifter 9 is provided for adjusting the ratio between the "on" period of time $T_{on}$ and the "off" period of time $T_{off}$ of the chopper 3 within the control period determined in this manner.

The oscillator 8 in the embodiment of the present invention is a known magnetic multivibrator (called a Royer oscillator) and is composed of a saturable core 81, a primary winding 82 and a secondary winding 87 would around this core 81, a pair of transistors 83 and 84 alternately turned on utilizing the saturation of the core 81, and resistors 85 and 86. A rectangular waveform a.c. voltage appears across the secondary winding 87 of the oscillator 8. A constant voltage power supply is required for this Royer oscillator 8 in order that the oscillation frequency thereof can be maintained constant. To this end, a resistor 10 and a Zener diode 11 are connected in series with the battery 1 to obtain a constant voltage across the Zener diode 11.

The magnetic phase shifter 9 of the magnetomotive force comparing type has a structure as described below. Basically, the magnetic phase shifter 9 comprises a pair of saturable cores 901 and 902, a common control winding 903 wound around these cores 901 and 902, and a pair of output windings (or a.c. windings) 904 and 905 which are wound around the respective core 901 and 902 and to which the a.c. output of the oscillator 8 is applied. The output windings 904 and 905 are connected in series through an additional resistor 906, and a pair of diodes 907 and 908 are provided to obtain the logical sum of the magnetic phase shifter outputs appearing in the positive and negative half cycles of the oscillator output. In practice, a bias winding 909 is provided so that the output characteristic relative to the controlling magnetomotive force can be shifted to the usable range, and this bias winding 909 is connected to the constant voltage power supply through a resistor 12. Further, a feedback winding 910 is provided inasmuch as an open loop control is not intended, and this feedback winding 910 is used for the negative feedback of a voltage corresponding to the motor current, for example, a voltage appearing across the resistor 7. Further, a time delay is necessary for the stabilization of the control system. To this end, a short-circuit winding 911 is provided and this winding 911 is shorted by a resistor 912 of low resistance.

Such a structure is basically the same as that of a magnetic amplifier of the center-tapped doubler type. The operating principle of the magnetic phase shifter or amplifier will be described with reference to FIGS. 2a, 2b and 2d. The following relation holds between the total controlling-magnetomotive force $\Sigma N_{ci} I_{ci}$ for the saturable cores and the mean value $E_L$ of the load voltages in the amplifying region:

$$E_L = A_{VH}(\Sigma N_{ci} I_{ci} + N_L I_{Lo}) \quad (3)$$

where $A_{VH}$ is the amplification degree (voltage/unit controlling magnetomotive force) and $N_L I_{Lo}$ is the magnetomotive force in the output windings. Further, the time constant T of this amplifier in the amplifying region can be expressed as $$T = A_{VH}(\Sigma N_{ci}^2/R_{ci})/2fN_L \quad (4)$$

where $R_{ci}$ is the circuit resistance of the control windings $N_{ci}$ and f is the a.c. output frequency of the oscillator. The load voltage $R_L I_{Lo}$ of the output windings due to the exciting current $I_{Lo}$ is commonly selected to be sufficiently low compared with the peak value $E_a$ of the rectangular waveform a.c. voltage, and thus, this load voltage $R_L I_{Lo}$ may be neglected. In this case, the width of the load voltage appearing in the saturated state of the cores 901 and 902, hence the firing angle $\theta$, is approximately determined by the following equation:

$$E_L = E_a \frac{\theta}{\pi}$$

Therefore, $$\theta = \pi \frac{A_{VH}}{E_a}(\Sigma N_{ci} I_{ci} + N_L I_{Lo}) \quad (5)$$

Therefore, the portion $\theta$ of the output waveform of this magnetic amplifier can be utilized for controlling the duty factor $\alpha$ of the chopper. The magnetic amplifier can be called the magnetic phase shifter of the magnetomotive force comparing type when it is operated in such a manner. The output voltage $E_L$ or chopper conducting angle $\theta$ relative to the controlling magnetomotive force has a characteristic as shown by the one-dot chain line in FIG. 2d. Thus, a bias voltage corresponding to the magnetomotive force $N_L I_{Lo}$ is applied to the bias winding 909 as described previously in order that the conducting angle $\theta$ can also be shifted to zero when the controlling magnetomotive force $\Sigma N_{ci} I_{ci}$ is reduced to zero. Consequently, the phase shifter shows a characteristic as shown by the solid line in FIG. 2d.

Further, as will be apparent from the equation (4), a delay time can be obtained without substantially affecting the operation of other control circuit portions when a circuit portion including a control winding is solely shorted by a circuit resistance $R_{ci}$ of small value. The short-circuit winding 911 and the resistor 912 above described are provided for this purpose.

Figure 2:
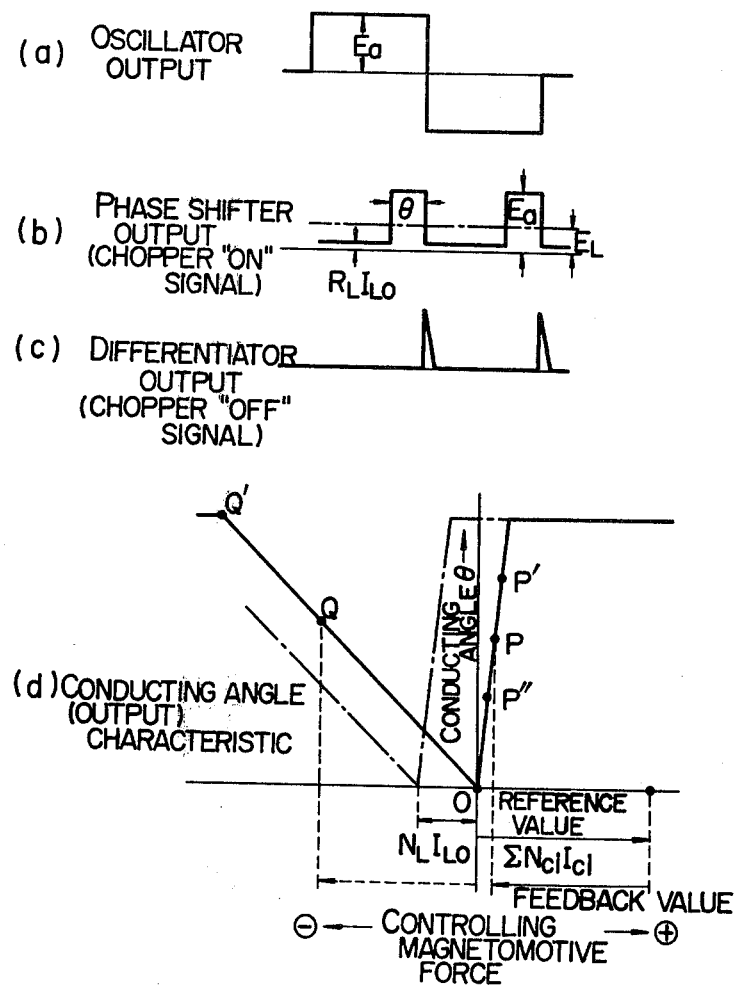
FIG. 2 shows voltage waveforms appearing at various parts of FIG. 1 and gives also a graphic representation of the control characteristic for illustrating the operation of the system shown in FIG. 1.

The output of the magnetic phase shifter 9 appears across a load resistor 13 and this voltage has a large width as shown in FIG. 2b. This voltage output is connected to the gate of the main thyristor 31 through a diode 14 and a resistor 15 to be applied as a signal for turning on the chopper 3.

On the other hand, a signal for turning off the chopper 3 may be derived in various ways. In FIG. 1, such signal is obtained by differentiating the voltage across the primary winding 82 of the magnetic multivibrator 8 by a differentiator 16. More precisely, due to the fact that a rectangular waveform as shown in FIG. 2a appears also across the primary winding 82 of the magnetic multivibrator 8, a pulse as shown in FIG. 2c can be obtained by differentiating this rectangular waveform. The rectangular waveform is differentiated in the rising period by the combination of a capacitor 161 and a resistor 162, and after the half cycle, the rectangular waveform is differentiated in the falling period by the combination of another capacitor 163 and another resistor 164. These differentiated outputs are applied to an OR gate consisting of a pair of diodes 165 and 166 to obtain a pulse as shown in FIG. 2c for turning off the chopper 3. This chopper turning-off pulse is applied to the gate of the auxiliary thyristor 33 through a resistor 17.

The operation fo the system will now be briefly described.

When a starting switch 18 is closed and a variable resistor 19 is suitably adjusted to apply a suitable control instruction voltage to the control winding 903, the cores 901 and 902 having been placed in the non-saturated region are saturated and a rectangular waveform voltage appears across the load resistor 13. This voltage is applied to the main thyristor 31 in the chopper 3 to turn on the main thyristor 31, hence the chopper 3. On the other hand, chopper turning-off pulses obtained by differentiating the output voltage of the oscillator 8 are applied to the auxiliary thyristor 33 with a constant period as shown in FIG. 2c. Therefore, the chopper 3 is repeatedly turned on and off as described previously. The current flowing through the motor 2 due to the turn-on of the chopper 3 is detected by the resistor 7 which acts to supply current to the feedback winding 910 in a direction opposite to the direction of current flow in the control winding 903. Therefore, the cores 901 and 902 of the magnetic phase shifter 9 are saturated with timing corresponding to the difference or error between the instructed current value (reference value) and the value of feedback current and act to reduce this error. As a result, stabilization is reached at a point P in FIG. 2d and a corresponding conducting angle $\theta$ is given. Therefore, the motor current coincides with the instructed current value.

It will be understood from the above description that the magnetic phase shifter 9 of the magnetomotive force comparing type can exhibit many functions demanded for a chopper control system. These functions include among others i) comparison between a reference value and an actually detected controlled variable, ii) isolation of the controlled variable detecting section (the main circuit) from the control circuit, iii) amplification of the difference or error obtained by the comparison, iv) conversion of the error into a duty factor signal, v) wave shaping, vi) power amplification, vii) isolation of the chopper from the control circuit, and viii) adjustment of delay time for the stabilization of the control system.

Thus, the present invention provides the following advantages:

1. The magnetic phase shifter of the magnetomotive force comparing type which is a single part can provide many functions demanded for the chopper control system. Thus, the number of parts in the entire control system can be greatly reduced and reliability of the system can be improved.

2. The operation of the object to be controlled by the chopper is not adversely affected during detection of the controlled variable of the object controlled by the chopper. More precisely, due to the fact that the feedback winding 910 may merely have one to two turns to provide a sufficiently large controlling magnetomotive force, the resistance value of the feedback winding 910 is very small such that it does not adversely affect the operation of the controlled object.

Further, when, for example, it is desired to detect the motor voltage for the feedback of same, the feedback winding 910 may have more turns and may be connected to the detected end through a resistor having a high resistance value. In this case too, the operation of the controlled object is not adversely affected.

3. Detection of the controlled variable, comparison of the detected controlled variable with the reference value, and delivery of the duty factor signal obtained as a result of comparison can be carried out in an isolated state without requiring any especial isolating means. Thus, the chopper control means can reliably operate regardless of the difference between the potential of the control circuit and that of the main circuit, and the degree of freedom of circuit design is very high.

4. By virtue of the isolation above described, the chopper control operation can be satisfactorily carried out without being substantially adversely affected by noise and surge voltage which occur frequently in the main circuit including the chopper and motor. Further, due to the fact that the magnetic phase shifter itself acts primarily to respond to the mean value of controlling magnetomotive forces, this ensures further freedom from adverse effects by noise.

While the chopper control system having a structure as shown in FIG. 1 has many advantages as above described, it has a minor disadvantage. More precisely, since the control input is applied in the form of a magnetomotive force, an unstable condition or a so-called divergent phenomenon occurs, as hereinafter described, when a negative control input which is outside of the normal operating range of the magnetic phase shifter is applied to the magnetic phase shifter. Thus, in spite of the fact that the control system including the magnetic phase shifter is stable in the normal operating range, an undesirable shift in the operating point may take place in the control system in the unstable region resulting in possibilities of failure of commutation by the chopper and damage to the load.

This will be described in detail with reference to FIG. 2d. Generally, the magnetic phase shifter operates at the point P where the magnetomotive force due to the load current given by the feedback winding 910 is approximately equal to the reference value given by the control winding 903. If the load current is decreased for some reason, the operating point shifts to a point P' tending to increase the conducting angle $\theta$ thereby compensating for the decrease of the load current. In the contrary case in which the load current is increased, the operating point P shifts to a point P'' tending to suppress the increase in the load current. In this manner, the load current is controlled to be equal to the reference value.

However, when, for example, the reference value is abruptly decreased to zero, the load current cannot fully respond to such an abrupt decrease in the reference value and the operating point P will shift to a position as shown by a point Q. A slight increase in the conducting angle $\theta$ at this point Q results in an increase in the load current, and this results in an increase in the conducting angle $\theta$ until finally the operating point will diverge toward a point Q'. Further, even when the reference value is maintained constant, the operating point tends to shift toward the point Q with an increase in the pulsation of the load current, and thus, a divergence from the normal of the operating point tends to occur even with slight disturbance.

In order to eliminate such a drawback, the total magnetomotive force applied to the magnetic phase shifter must be prevented from going negative in FIG. 2d. This may be attained by a method in which diodes are inserted in the circuit for applying a single input. However, in the present invention in which a magnetic phase shifter of the magnetomotive force comparing type is employed as above described, the capability of applying many inputs (a reference value, a feedback value, etc.) in an isolated state is the most important merit, and thus, it is impossible to solve the problem by methods employing diodes and the like.

Further, a characteristic curve as shown by the one-dot chain line in FIG. 2d results when the bias voltage corresponding to $N_L I_{LO}$ disappears for some reason. In this case, the conducting angle $\theta$ will become maximum even when the reference value is zero. Thus, minor trouble or a slight variation of the operating state may give rise to a serious accident or so-called fail-out of the system may occur, and expensive protecting means are required in order to prevent this fail-out.

Figure 3:
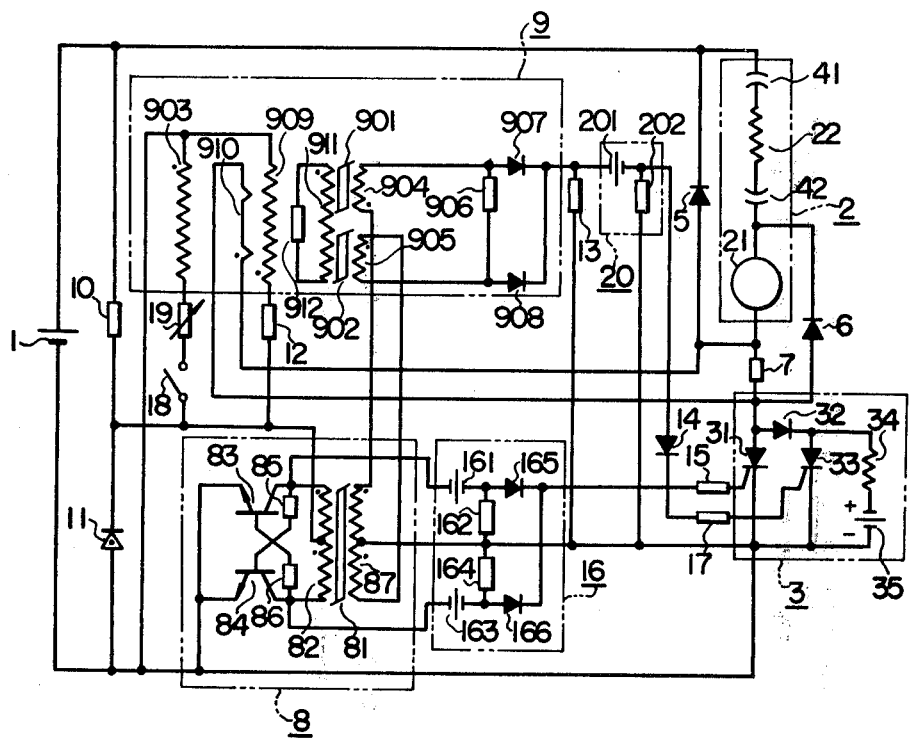
FIG. 3 is an electrical circuit diagram of another embodiment of the chopper control system according to the present invention.

A modified or improved chopper control system free from such a drawback is shown in FIG. 3. The system shown in FIG. 3 differs in the first place from that shown in FIG. 1 in that the reference value is applied to the control winding 903 of the magnetic phase shifter 9 in a direction opposite to the direction of application of the feedback value to the feedback winding 910. (In FIG. 3, the starting end shown by the symbol · of these windings is opposite to that shown in FIG. 1.) In the system of FIG. 3 having such an arrangement, the conducting angle characteristic relative to the abscissa or controlling magnetomotive force is in reverse to that shown in FIG. 2d.

Figure 4:
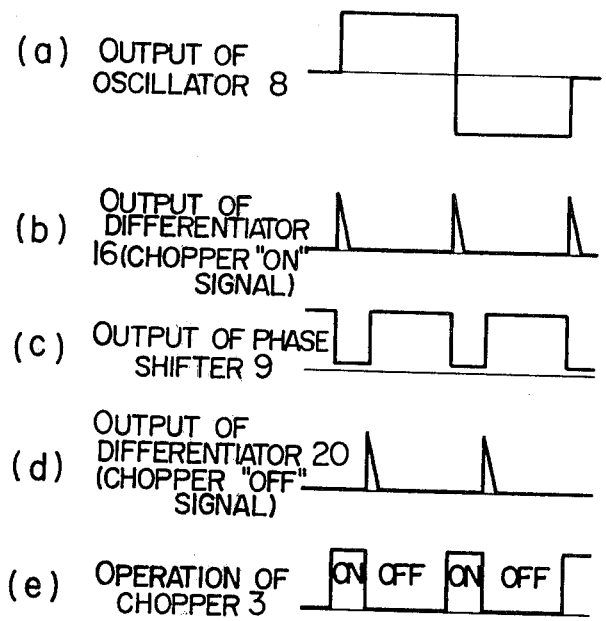
FIG. 4 shows voltage waveforms appearing at various parts of FIG. 3 and gives also a graphic representation of the control characteristic for illustrating the operation of the system shown in FIG. 3.
Figure 4:
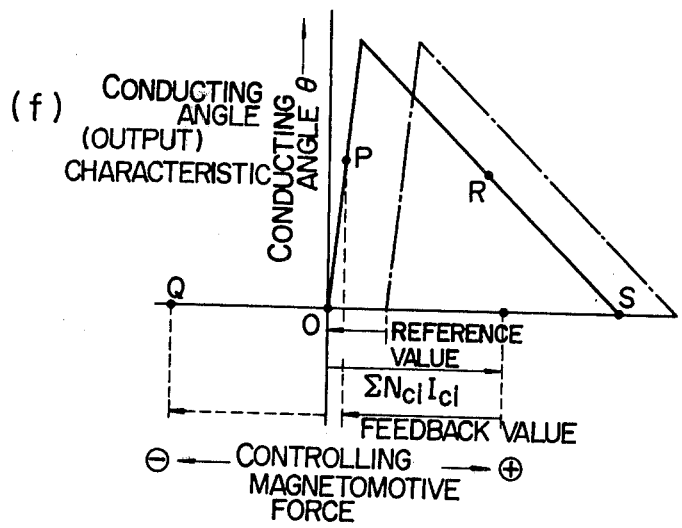

In the second place, this modified system is constructed in such a manner that the chopper 3 is turned on during the period of time in which no output appears from the magnetic phase shifter 9. More precisely, the magnetic phase shifter 9 delivers an output voltage as shown in FIG. 4c and the chopper 3 is turned on during the period of time in which no output voltage appears from the magnetic phase shifter 9. Therefore, the chopper 3 operates as shown in FIG. 4e. Due to the fact that the operation of the chopper 3 in FIG. 3 is reverse to that in FIG. 1, the ordinate or conducting angle $\theta$ in the conducting angle characteristic shown in FIG.

4f is an inversion of that shown in FIG. 2d. Practical circuitry for attaining such chopper operation may be such that the output of the differentiator 16 used for turning off the chopper 3 in FIG. 1 may be utilized to turn on the chopper 3 in FIG. 3 and the output voltage of the magnetic phase shifter 9 may be differentiated by a differentiator 20 composed of a capacitor 201 and a resistor 202 to obtain a signal for turning off the chopper 3. The conducting angle characteristic shown in FIG. 2d is reversed in both the abscissa and the ordinate by the first and second modifications above described, the conducting angle characteristic is as shown by the one-dot chain line in FIG. 4f.

In the third place, the conducting angle characteristic of the system shown in FIG. 3 is modified as shown by the solid line in FIG. 4f due to the fact that the biasing magnetomotive force is applied to the bias winding 909 of the magnetic phase shifter 9 in a direction opposite to that shown in FIG. 1 and the magnitude thereof is suitably adjusted.

In such an arrangement, a balance between the reference value and the detected load current value (feedback value) is reached at a point P in the normal operating state in entirely the same manner as that described with reference to FIG. 2d. However, the conducting angle θ can be maintained at zero even when the controlling magnetomotive force is reduced to zero due to an abrupt decrease of the reference value to, for example, zero and the operating point P shifts to a point Q. Further, even when the load current is considerably small compared with the reference value and the operating point shifts to a point R, the load current will be decreased or temporarily increased until finally the operating point will be settled at the point P. Furthermore, the conducting angle θ can be maintained at zero when an excessively large reference value is erroneously applied and the operating point shifts beyond a point S. Moreover, the conducting angle θ is maintained at zero unless the reference value is increased even when the characteristic as shown by the one-dot chain line results from disappearance of the biasing magnetomotive force.

It will thus be understood that this modification provides an ideal chopper control system which can operate stably and reliably in whatever situations.

It is desirable to apply a pulse of large pulse width for turning on the chopper 3 which is composed of thyristors in most cases. Further, it is difficult to completely control the conducting angle θ within the range of 0° to 180°. A modification or improvement of the system shown in FIG. 3 based on such a standpoint will be described with reference to FIG. 5.

In the system of FIG. 3, the chopper 3 continues to conduct the load current for a short period of time even when the commutating auxiliary thyristor 33 is turned on. More precisely, both the thyristors 31 and 33 are turned off after the charge stored in the illustrated polarity the capacitor 35 has discharged through the reactor 34 and auxiliary thyristor 33 and the polarity thereof has been inverted by the LC oscillation. Therefore, when the pulse signal of large pulse width for turning on the main thyristor 31 is applied during the period of time required for commutation, the capacitor 35 has no chance of recharging and yet the chopper 3 is maintained turned on. Even when the chopper turning-off signal is applied to the auxiliary thyristor 33 for turning off the chopper 3 in this state, the chopper 3 is not turned off due to the absence of the commutation energy. In the case in which such failure of commutation occurs, there is no means other than breaking the circuit by means such as a circuit breaker. In order to avoid such failure, the signal for turning on the chopper 3 must be applied after the commutating period of time has completely elapsed.

Figure 5:
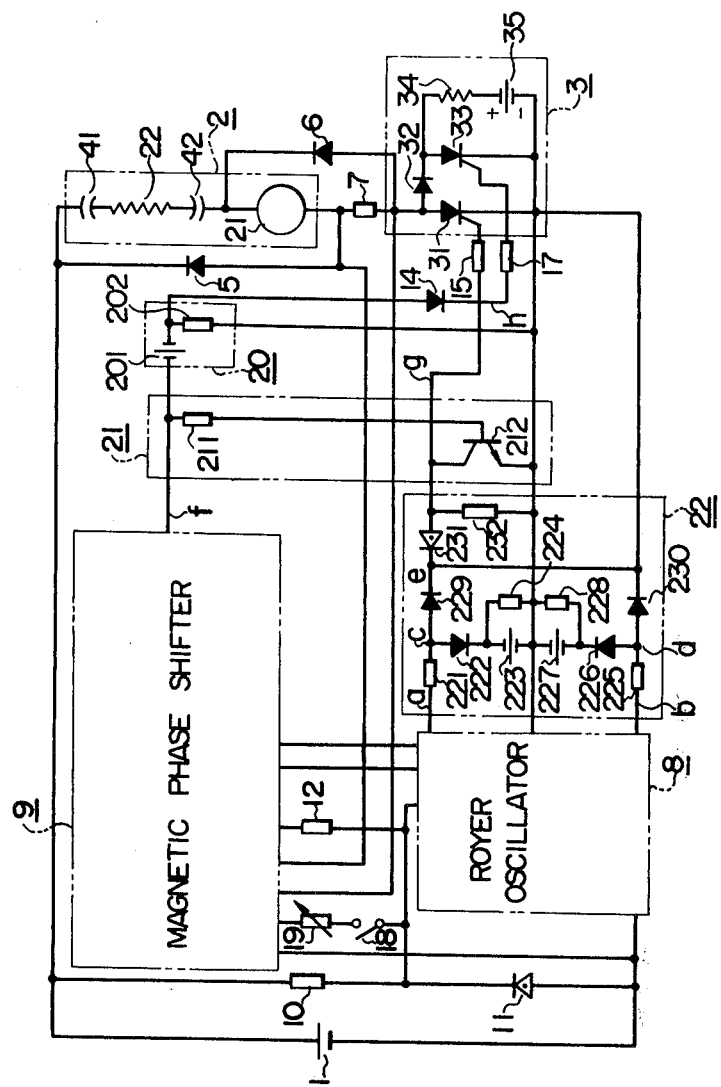
FIG. 5 is an electrical circuit diagram of a further embodiment of the chopper control system according to the present invention.

The modified system shown in FIG. 5 is constructed so that a pulse signal of large pulse width for turning on the chopper 3 can be obtained without differentiating the output of the oscillator 8. In the arrangement shown in FIG. 5, the output of the differentiator 20 is applied to the auxiliary thyristor 33 for turning off the chopper 3 as in the system shown in FIG. 3 in order to turn off the chopper 3 at the time at which the output voltage appears from the magnetic phase shifter 9. Further, an unnecessary pulse portion removing circuit 21 comprising a resistor 211 and a transistor 212 is interposed between the oscillator 8 and the main thyristor 31 so that the transistor 212 can be turned on by the output voltage of the phase shifter 9 applied through the resistor 211. Furthermore, a conducting angle limiting circuit 22 is provided so that the pulse signal for turning on the chopper 3 may not appear during the commutating period of time for the chopper 3. This conducting angle limiting circuit 22 comprises a delay circuit (an integrating type delay circuit) composed of resistors 221, 222, diodes 223, 224, capacitors 225, 226 and resistors 227, 228, a pair of diodes 229 and 230 which conduct in the positive and negative half cycles respectively, a Zener diode 231 which cuts the output for a short period of time Δt corresponding to the commutating period of time, and a resistor 232.

FIG. 6 shows voltage waveforms appearing at parts a to h in FIG. 5. It will be seen from FIG. 6 that the chopper 3 is turned on at the time which is delayed by Δt from the beginning point of each half cycle of the output of the oscillator 8 and is turned off in response to the appearance of the output of the phase shifter 9. Thus, even when the conducting angle $\theta(T_{on})$ is increased to its maximum value, $T_{on}$ does not overlap the commutating period of time Δt and failure of commutation as pointed out above can be obviated.

What we claim is:

1. A chopper control system having a chopper for controlling a current supplied from a d.c. power supply to a load, and means for controlling said chopper, wherein said chopper control means comprises an oscillator and a magnetic phase shifter, and said magnetic phase shifter includes a saturable core, a control winding wound around said core to be applied with a control instruction signal, and an output winding wound around said core to be applied with the output of said oscillator, and further comprising means for deriving a "negation" of the output of said magnetic phase shifter, and means for actuating said chopper in response to said "negation" of the output.

2. A chopper control system as claimed in claim 1, wherein said "not" output deriving means comprises a first differentiating means for differentiating the output of said oscillator and a second differentiating means for differentiating the output of said output winding, and said chopper actuating means comprises means for turning on said chopper in response to the appearance of the output from said first differentiating means and turning off said chopper in response to the appearance of the output from said second differentiating means.

3. A chopper control system as claimed in claim 1, wherein said "not" output deriving means comprises means for removing a portion of the output of said oscillator during the period of time in which said magnetic phase shifter delivers its output.

4. A chopper control system as claimed in claim 3, wherein said "not" output deriving means comprises conducting angle limiting means for cutting the rising portion of the output of said oscillator for a predetermined period of time.

5. A chopper control system comprising a d.c. power source, a load, a chopper for controlling a load current supplied from said d.c. power source to said load, said chopper including at least a main thyristor for permitting the load current to flow therethrough and an auxiliary thyristor for turning-off said main thyristor, and chopper control means for controlling the output of said chopper by applying a chopper-on signal and a chopper-off signal to said main thyristor and said auxiliary thyristor respectively, said chopper control means including:
an oscillator which oscillates at a fixed frequency, the period of oscillation of said oscillator determining a period for controlling said chopper;
a magnetic phase shifter for adjusting the ratio of the chopper-on period to the chopper-off period in said chopper control period, said magnetic phase shifter including a saturable core, a control winding wound on said core for receiving a control instruction, an output winding wound on said core for receiving the output of said oscillator, and a feedback winding wound on said core for feeding back a detected value corresponding to said load current, thereby adjusting said ratio of the chopper-on period to the chopper-off period in response to deviations of said detected value from said control instruction; and
means for delivering one of the outputs of said oscillator and said magnetic phase shifter as the chopper-on signal and the other as the chopper-off signal.

6. A chopper control system as claimed in claim 5, wherein said load includes a d.c. series motor and is provided with a first diode connected inversely parallel with the series circuit of the armature and field coil of said motor, a second diode connected inversely parallel with said armature, and reversers for changing over the polarity of said field coil.

7. A chopper control system according to claim 5, wherein said oscillator is a rectangular waveform generator and said chopper-on and chopper-off signal delivering means includes a differentiating circuit, whereby the output of said magnetic phase shifter is delivered as the chopper-on signal and the output of said rectangular waveform generator is delivered through said differentiating circuit as the chopper-off signal.

8. A chopper control system according to claim 5, wherein said oscillator is a rectangular waveform generator and said chopper-on and chopper-off signal delivering means includes a differentiating circuit, whereby the output of said magnetic phase shifter is delivered as the chopper-off signal and the output of said rectangular waveform generator is delivered through said differentiating circuit as the chopper-on signal.

9. A chopper control system according to claim 5, wherein a short-circuit winding is provided on said core, said short-circuit winding being short-circuited through an impedance element.

\* \* \* \* \*